United States Patent
Yang et al.

(10) Patent No.: US 11,715,151 B2
(45) Date of Patent: Aug. 1, 2023

(54) SYSTEMS AND METHODS FOR RETRAINING OF MACHINE LEARNED SYSTEMS

(71) Applicant: Walmart Apollo, LLC, Bentonville, AR (US)

(72) Inventors: Binwei Yang, Milpitas, CA (US); Alessandro Magnani, Menlo Park, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 61 days.

(21) Appl. No.: 17/163,497

(22) Filed: Jan. 31, 2021

(65) Prior Publication Data

US 2021/0241363 A1 Aug. 5, 2021

Related U.S. Application Data

(60) Provisional application No. 62/968,407, filed on Jan. 31, 2020.

(51) Int. Cl.
*G06Q 30/06* (2023.01)
*G06Q 30/0601* (2023.01)
*G06N 20/00* (2019.01)

(52) U.S. Cl.
CPC ......... *G06Q 30/0643* (2013.01); *G06N 20/00* (2019.01)

(58) Field of Classification Search
CPC ......... G06Q 30/06–08; G06Q 39/0643; G06N 20/00
See application file for complete search history.

(56) References Cited

U.S. PATENT DOCUMENTS

| | | | |
|---|---|---|---|
| 7,680,703 B1* | 3/2010 | Smith | G06Q 30/06 705/26.8 |
| 8,429,173 B1* | 4/2013 | Rosenberg | G06F 16/5866 707/758 |
| 8,762,383 B2 | 6/2014 | Valencia-Campo et al. | |
| 9,639,827 B1* | 5/2017 | Li | H04L 67/306 |

(Continued)

FOREIGN PATENT DOCUMENTS

WO  WO-2018213205 A1 * 11/2018 ............... G06F 8/36

OTHER PUBLICATIONS

Google says machine learning is the future. So I tried it myself, Alex Hern Jun. 28, 2016; (Year: 2016).*

(Continued)

*Primary Examiner* — Yogesh C Garg
(74) *Attorney, Agent, or Firm* — Bryan Cave Leighton Paisner LLP (57) ABSTRACT

Systems and methods including one or more processors and one or more non-transitory storage devices storing computing instructions configured to run on the one or more processors and perform: training a visual similarity model; determining one or more nearest neighbors for an item using the visual similarity model, as trained; ranking the one or more nearest neighbors using results of the visual similarity model, as trained; re-ranking the one or more nearest neighbors using a learning-to-rank algorithm; and facilitating altering a graphical user interface (GUI) displaying the item based upon the one or more nearest neighbors, as re-ranked. Other embodiments are disclosed herein.

20 Claims, 5 Drawing Sheets

(56) References Cited

U.S. PATENT DOCUMENTS

| | | | |
|---|---|---|---|
| 10,824,942 B1* | 11/2020 | Bhotika | G06N 3/08 |
| 11,151,106 B1* | 10/2021 | Kulikov | G06F 17/145 |
| 2002/0019763 A1* | 2/2002 | Linden | G06Q 30/0254 |
| | | | 705/14.53 |
| 2012/0158710 A1* | 6/2012 | Burges | G06N 20/00 |
| | | | 707/E17.084 |
| 2015/0127673 A1 | 5/2015 | Pogrebnyak et al. | |
| 2016/0110794 A1 | 4/2016 | Hsiao et al. | |
| 2017/0329817 A1* | 11/2017 | Stoica-Beck | G06F 16/211 |
| 2019/0251446 A1 | 8/2019 | Fang et al. | |
| 2020/0210763 A1* | 7/2020 | Lin | G06K 9/6215 |
| 2021/0232621 A1* | 7/2021 | Jain | G06N 3/045 |

OTHER PUBLICATIONS

Recommended for You: How machine learning helps you choose what to consume next, Jennifer Wei, Aug. 28, 2017; (Year: 2017).*

Machine Learning: What it is and why it matters, SAS, Jan. 7, 2014. (Year: 2014).*

Tiezheng Ge, Kaiming He, Qifa Ke, and Jian Sun, Optimized Product Quantization for Approximate Nearest Neighbor Search, in Proceedings of the IEEE Conference on Computer Vision and Pattern Recognition, 2946-2953 (2013) (Year: 2013).*

Zhang, Weifeng et al. "Neural ranking for automatic image annotation", publication: Multimedia Tools and Applications 77.17: 22385-22406. Dordrecht: Springer Nature B.V. (Sep. 2018); retrieved from Dialog on Mar. 4, 2023 (Year: 2018).*

Kislyuk, D., et al., "Human Curation and Convnets: Powering Item-to-Item Recommendations on Pinterest," arXiv:1511.04003v1 [cs.CV], published Nov. 12, 2015. 6 pgs. Nov. 12, 2015.

Zhai, A., et al., "Visual Discovery at Pinterest," arXiv:1702.04680v2 [cs.CV], published Mar. 25, 2017, 10 pgs. Mar. 25, 2017.

Meiappane, A., et al., "One Click Image Search Re-Ranking Based on User Preference," Int'l Research Journal of Engineering & Technology, vol. 3, Issue 3, Mar. 2016, 6 pgs. Mar. 2016.

* cited by examiner

SYSTEMS AND METHODS FOR RETRAINING OF MACHINE LEARNED SYSTEMS

CROSS-REFERENCE TO RELATED APPLICATIONS

This application claims the benefit of U.S. Provisional No. 62/968,407, filed Jan. 31, 2020, which is herein incorporated by this reference in its entirety.

TECHNICAL FIELD

This disclosure relates generally to machine learned systems, and more particularly to systems for retraining machine learned systems.

BACKGROUND

Machine learning algorithms (e.g., unsupervised learning, deep learning, supervised learning, etc.) are becoming more commonplace in today's computer systems, but many data scientists and software engineers continue to encounter problems while training novel algorithms. One problem encountered when training machine learning algorithms is a lack of adequate amounts of representative training data. Machine learned algorithms trained on problematic training data suffer from a number of flaws. For example, machine learned algorithms trained on an insufficient amount of data can be inaccurate and, depending on the content of the training data, can overpredict or underpredict outcomes. Further, machine learned algorithms trained on non-representative training data can be skewed due to a unique event in the training data. These inaccuracies can also pose problems for machine learned algorithms used for automatic actions (e.g., automated trading algorithms, search engine marketing algorithms, etc.), as a severely overpredicted outcome can lead to recurring inaccurate predictions and therefore a degradation in system quality.

In the past, solutions to this problem of poor or insufficient amounts of training data have been simply to (1) gather more training data, (2) purchase higher quality training data sets from a vendor, or (3) use a pre-trained model. Each of these past solutions have their own limitations. In many instances, gathering more training data can be time consuming due to the large corpus of embeddings need to accurately train a machine learning model. Purchasing training data can also pose problems, as these training datasets can be expensive and can become outdated quickly. Further, many pre-constructed training datasets have their own biases that can affect an accuracy of a prediction. The disadvantages of pre-trained models are similar to those seen with purchased training data, as pre-trained models can also be expensive when they are bespoke, can become outdated quickly without updating or re-training, and can come pre-biased. Further, embeddings that have not been seen before by a model or are new can be misclassified by a model (pre-trained or not) due to a lack of representation in training data (either gathered or purchased). Therefore, there is a need for a system and method to retrain machine learning algorithms to avoid at least one of the problems discussed above.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform training a visual similarity model; determining one or more nearest neighbors for an item using the visual similarity model, as trained; ranking the one or more nearest neighbors using results of the visual similarity model, as trained; re-ranking the one or more nearest neighbors using a learning-to-rank algorithm; and facilitating altering a graphical user interface (GUI) displaying the item based upon the one or more nearest neighbors, as re-ranked.

Various embodiments include a method. The method can be implemented via execution of computing instructions configured to run at one or more processors and configured to be stored at non-transitory computer-readable media The method can comprise training a visual similarity model; determining one or more nearest neighbors for an item using the visual similarity model, as trained; ranking the one or more nearest neighbors using results of the visual similarity model, as trained; re-ranking the one or more nearest neighbors using a learning-to-rank algorithm; and facilitating altering a graphical user interface (GUI) displaying the item based upon the one or more nearest neighbors, as re-ranked.

Figure 1:
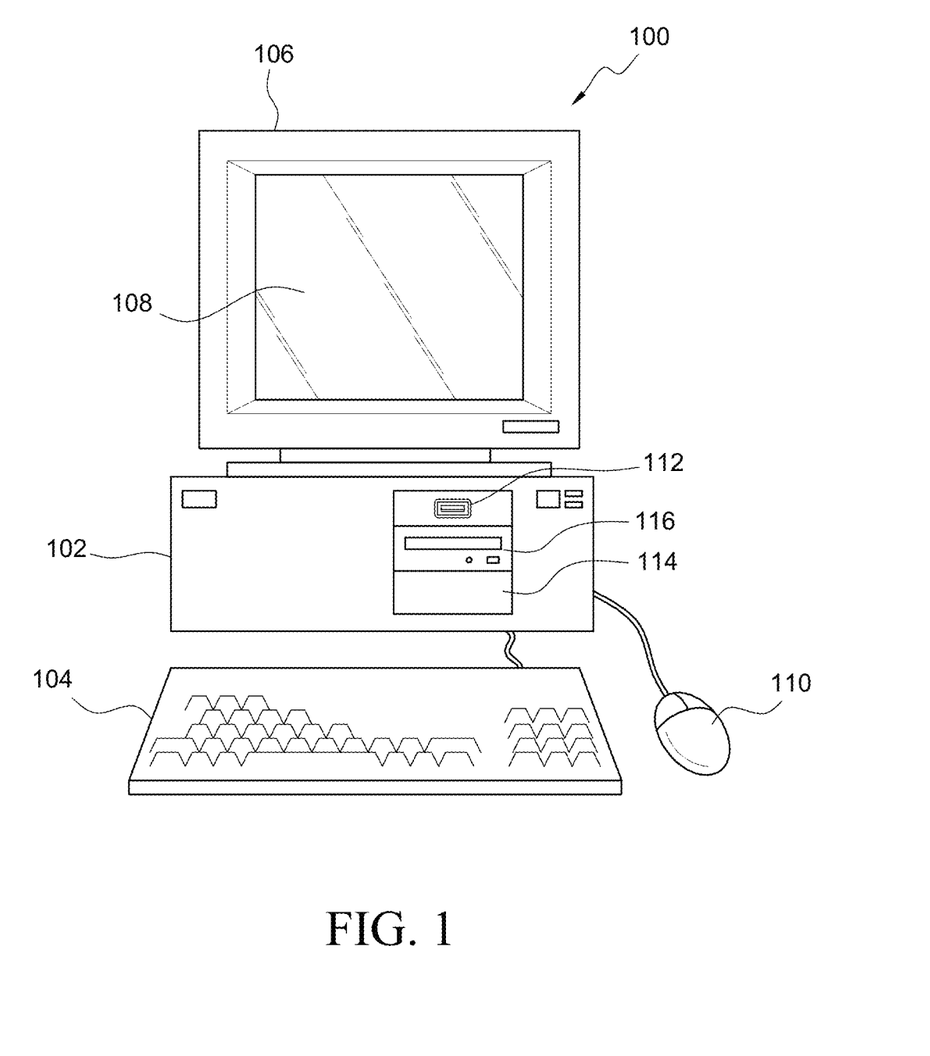
FIG. 1 illustrates a front elevational view of a computer system that is suitable for implementing various embodiments of the systems disclosed in FIGS. 3 and 5.
Figure 2:
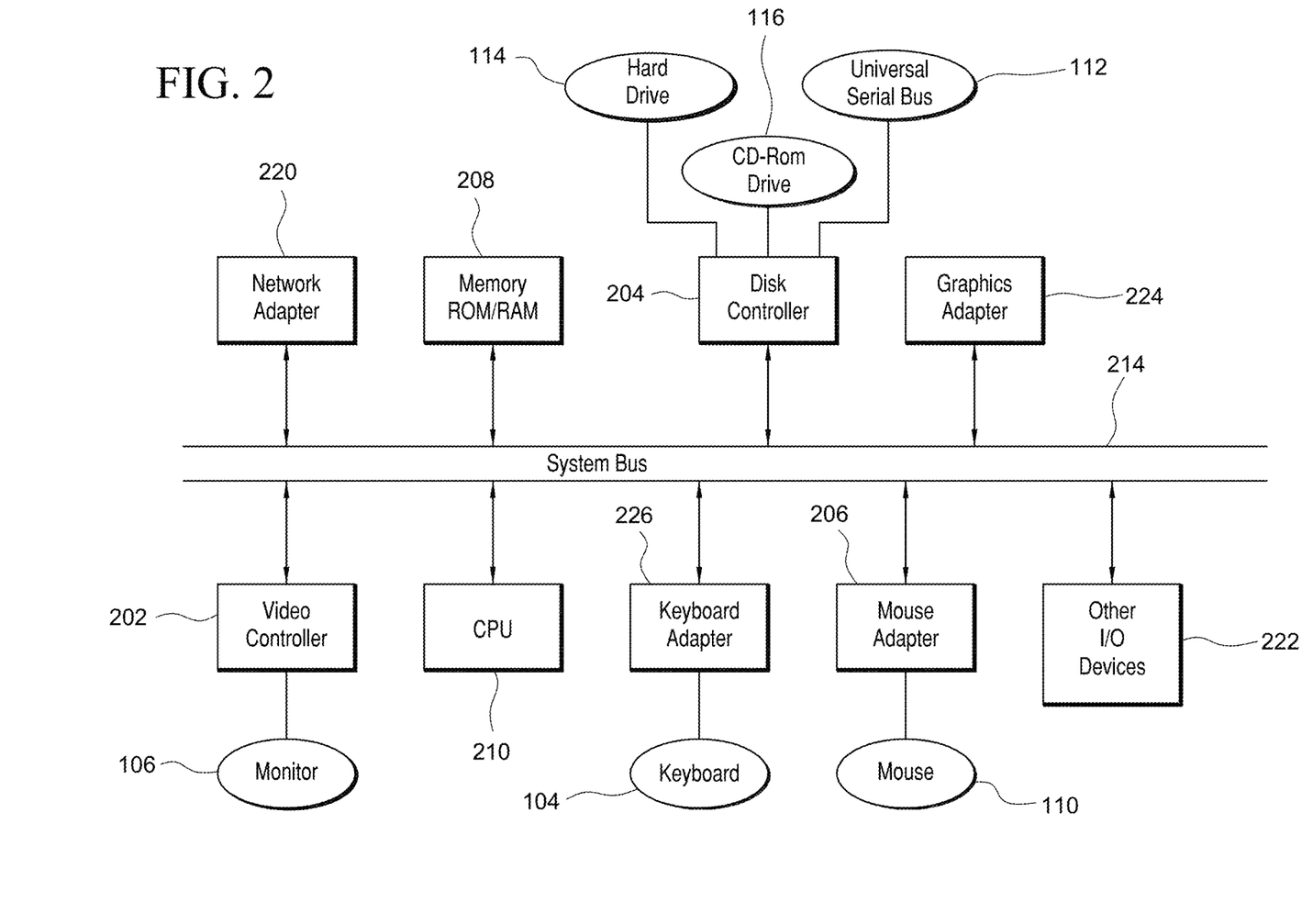
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv)

the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
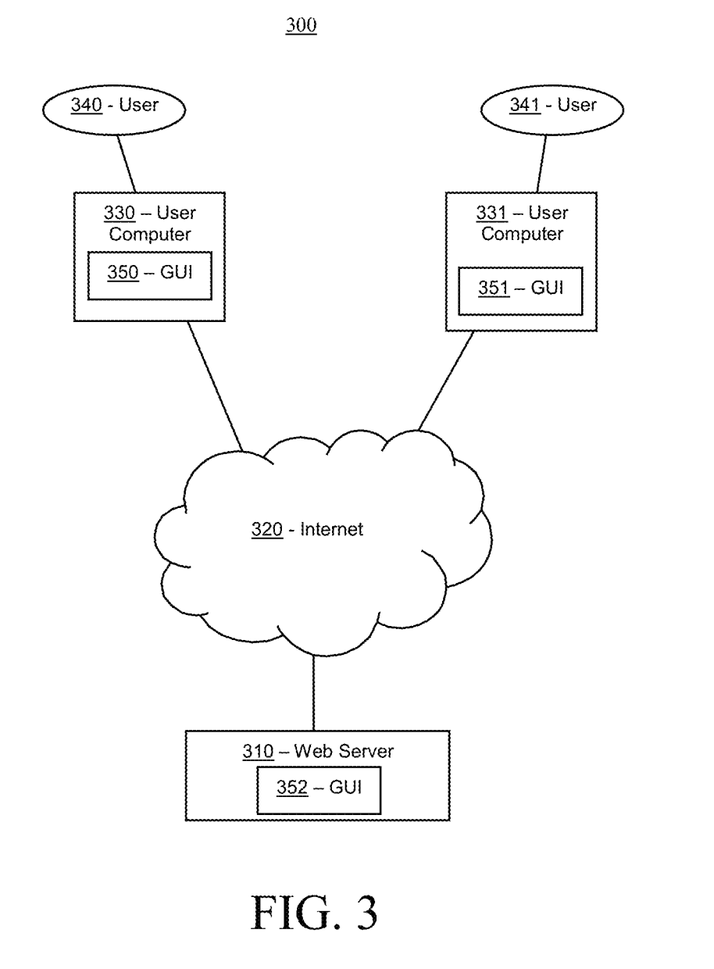
FIG. 3 illustrates a representative block diagram of a system, according to an embodiment.

Turning ahead in the drawings, FIG. 3 illustrates a block diagram of a system 300 that can be employed for retraining of machine learned systems, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310. Web server 310 can be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310. Web server 310 and provide a GUI 352. Additional details regarding web server 310 are described herein.

In many embodiments, system 300 also can comprise user computers 330, 331. In other embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interface ("GUI") 350-352. In the same or different embodiments, GUI 350-352 can be part of and/or displayed by user computers 330, 331, which also can be part of system 300. In some embodiments, GUI 350-352 can comprise text and/or graphics (image) based user interfaces. In the same or different embodiments, GUI 350-352 can comprise a heads up display ("HUD"). When GUI 350-352 comprises a HUD, GUI 350-352 can be projected onto glass or plastic, displayed in midair as a hologram, or displayed on monitor 106 (FIG. 1). In various embodiments, GUI 350-352 can be color or black and white. In many embodiments, GUI 350-352 can comprise an application running on a computer system, such as computer system 100, user computers 330, 331, and/or server computer 310. In the same or different embodiments, GUI 350-352 can comprise a website accessed through internet 320. In some embodiments, GUI 350-352 can comprise an eCommerce website. In the same or different embodiments, GUI 350-352 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 310 can be in data communication through Internet 320 with user computers (e.g., 330, 331). In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310. In a similar manner, the processing module(s) and the memory storage module(s) can be local and/or remote to each other.

In many embodiments, web server 310 can be configured to communicate with one or more user computers 340 and 341. In some embodiments, user computers 340 and 341 also can be referred to as customer computers. In some embodiments, web server 310 can communicate or interface (e.g., interact) with one or more customer computers (such as user computers 340 and 341) through a network or Internet 320. Internet 320 can be an intranet that is not open to the public. Accordingly, in many embodiments, web server 310 (and/or the software used by such systems) can refer to a back end of system 300 operated by an operator and/or administrator of system 300, and user computers 330 and 331 (and/or the software used by such systems) can refer to a front end of system 300 used by one or more users 340, 341, respectively. In some embodiments, users 340, 341 can also be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can allow for training of a machine learning algorithm to make predictions for embeddings with little or no training data. These techniques described herein can provide a significant technical improvement over conventional approaches of training a machine learning algorithm, such as arduously gathering training data, purchasing an expensive corpus of training data, and/or using a pertained model. In various embodiments, the techniques described herein can beneficially make determinations based on dynamic information that describes current conditions and/or conditions that have occurred during the same day of a request for a machine learned prediction. In this way, the techniques described herein can avoid problems with stale and/or outdated machine learned models by continually updating.

In a number of embodiments, the techniques described herein can solve a technical problem that arises only within the realm of computer networks, as machine learning algorithms do not exist outside the realm of computer networks.

Figure 4:
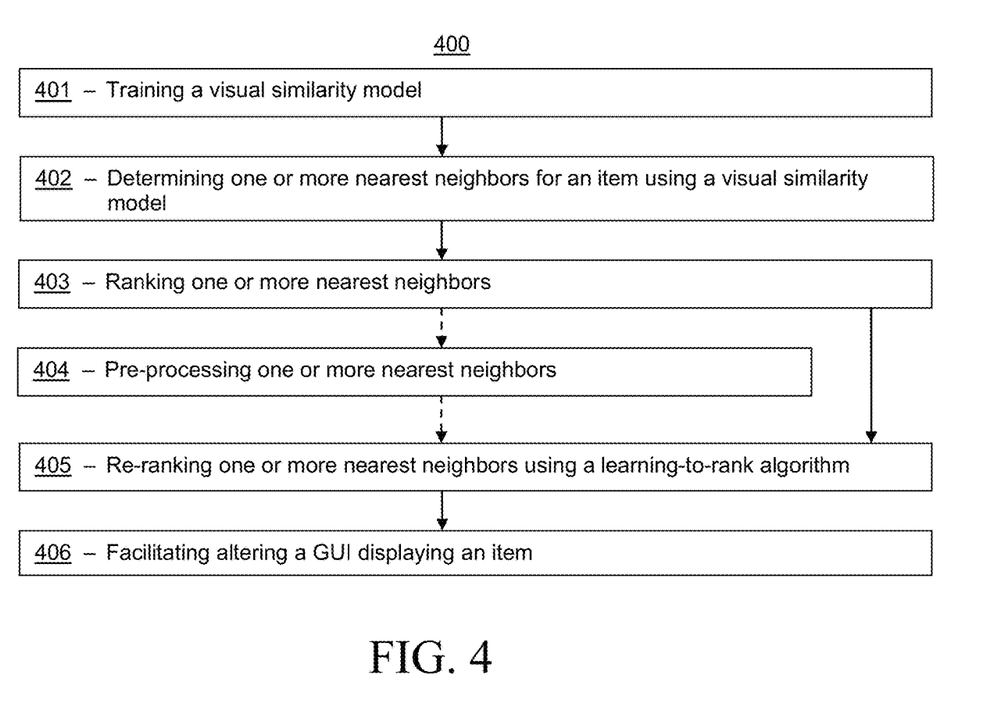
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 (FIG. 3). The processing module(s) can be similar or identical to the processing module(s) described above with respect to computer system 100 (FIG. 1).

In many embodiments, method 400 can comprise an activity 401 of training a visual similarity model. In various embodiments, a visual similarity model can comprise one or more machine learning algorithms. In some embodiments, training a visual similarity model can comprise estimating internal parameters of one or more models configured to output one or more vector representation of an item. In various embodiments, a machine learning algorithm can be trained using labeled training data, otherwise known as a training dataset. In some or other embodiments, training a machine learning algorithm can be performed offline (e.g., when a computer system 100 (FIG. 1) is disconnected from internet 320 (FIG. 3)). In many embodiments, a training dataset can comprise all or a portions of a repository of digital images of items and/or a repository of non-image features of the items. In various embodiments, non-image features of an item can comprise structured data (e.g., material, finish, style, etc.) and/or unstructured data (e.g., descriptions, titles, user ratings, etc.).

In many embodiments, a training dataset can be generated from an online catalogue of an eCommerce retailer. In these embodiments, a machine learning algorithm in a visual similarity model can be configured to output one or more embeddings representing items in the product catalogue. In the same or different embodiments, a pre-trained machine learning algorithm can be used, and the pre-trained algorithm can be re-trained on labeled training data. In some embodiments, the machine learning model can also consider both historical and dynamic input from incoming item images and/or non-image features submitted to an eCommerce retailer by suppliers. In this way, a machine learning algorithm can be trained iteratively as data from new listings for an eCommerce website are added to a training data set. In many embodiments, a machine learning algorithm can be iteratively trained in real time as data is added to a training data set. In several embodiments, due to a large amount of data needed to create and maintain a training data set, a machine learning model can use extensive data inputs to generate embeddings. Due to these extensive data inputs, in many embodiments, creating, training, and/or using a machine learning algorithm configured to generate embeddings cannot practically be performed in a mind of a human being.

In many embodiments, training a visual similarity model can comprise training an image similarity model and/or training a textual similarity model. In some embodiments, an image similarity model and/or a textual similarity model can each comprise one or more machine learning algorithms. In these or other embodiments, a machine learning algorithm of an image similarity model and/or a machine learning algorithm of a textual similarity model can be trained using procedures substantially similar to those described above with reference to a visual similarity model.

In many embodiments, an image similarity model can be configured to output embeddings representing images of items (i.e. image embeddings). In many embodiments, an image similarity model can comprise a deep learning model. In some embodiments, the deep learning model can comprise a convolutional neural network and/or an attention based network (e.g., transformer networks and/or a recurrent neural network). In embodiments where a convolutional neural network is used, a pre-rained Inception-ResNet-v2 model can be retrained on a repository of digital images. In some embodiments, a last shared layer of a convolutional neural network can be outputted as an image embedding.

In many embodiments, a textual similarity model can be configured to output embeddings representing non-image features of an item (e.g. textual embeddings). In these or other embodiments, a textual similarity model can be trained using labels generated from non-image features of an item or the non-image features of the item themselves. In some embodiments a text similarity model is used. For example, a feed-forward Neural-Net Language Model (NNLM) and/or a Bidirectional Encoder Representations from Transformers (BERT) model can be used. In these or other embodiments, a semantic similarity model is used. For example, a recurrent neural network can be used.

In many embodiments, method 400 can comprise an activity 402 of determining one or more nearest neighbors for an item using a visual similarity model. In some embodiments, one or more nearest neighbors can comprise determining one or more embeddings closest to a specific embedding in a vector space. In some embodiments, a specific embedding can be an embedding as generated by all or a part of a visual similarity model, as described above. In various embodiments, a specific embedding can be generated for a new item. In these or other embodiments, a visual similarity model can generate more than one embedding (e.g., one image embedding and one textual embedding), and each of these embeddings can have their own nearest neighbors determined. In some embodiments, image nearest neighbors from an image similarity model are generated in parallel with text nearest neighbors from a textual similarity model.

In many embodiments, determining one or more nearest neighbors can comprise storing one or more embeddings. In some embodiments, an embedding can be stored in a data store configured to store high dimensional data. For example, high dimensional data can be stored in Facebook AI Similarity Search (AKA "Faiss") and/or Elastic Search. In the same or different embodiments, high dimensional data can comprise data having a large number of features, thereby leading to "the curse of dimensionality," as known in the art. In some embodiments, an embedding can be stored as a sparse representation in a data store configured to store high dimensional data. In these embodiments, storage efficiency can be improved by encapsulating embeddings into coarser, conceptual embeddings that are then stored. In some embodiments, a sparse representation of an embedding can store only non-zero counts for vectors in the embedding. This technique, then, can reduce required storage space, and can consequently make subsequent reading and/or processing of the sparse representation of an embedding faster than reading and/or processing of embeddings that are not stored as sparse representations. In many embodiments, a sparse representation of an embedding can be stored in a data store configured to store high dimensional data, as described above. In many embodiments, one or more embeddings as generated in at least a portion of a visual similarity model can be stored in a data store configured to store high dimensional data.

In many embodiments, an index can be built for one or more stored embeddings. In these or other embodiments, an index can be a main-memory based index. In various embodiments, a main-memory based index can comprise an index stored in a memory (e.g., RAM) of a computer system, as opposed to a disk based index, which is stored on a hard disk of a computer system. In embodiments where a main-memory based index is used, processing time for searching an index of embeddings (and thereby finding nearest neighbors, as described in more detail below) can be minimized due to increased data access speeds for the memory as opposed to a hard disk. In various embodiments, a similarity search can be used to determine one or more nearest neighbors. In these or other embodiments, a similarity search can be configured to create clusters of similar vectors (e.g., embeddings closest to a specific embedding in a vector space). In some embodiments, a similarity search can be configured to implement k-means clustering in combination with item quantization. In this way, a similarity search can result in faster index retrieval and a higher precision of determination of top nearest neighbors.

In many embodiments, method 400 can comprise an activity 403 of ranking one or more nearest neighbors. In many embodiments, one or more nearest neighbors can be sorted and/or ranked using a similarity metric determined by a similarity search. In these or other embodiments, items associated with the embeddings of one or more nearest neighbors (as ranked or unranked) can be stored in a full text search engine database. In various embodiments, items stored in a full text search engine database can be labeled as substitutes for a specific item. In many embodiments, a nearest neighbor can comprise a substitute for an item.

In many embodiments, method 400 can optionally comprise an activity 404 of pre-processing one or more nearest neighbors. In some embodiments, two sets of embeddings representing nearest neighbors for each item can be joined. In these or other embodiments, embeddings can be joined by loading them into a distributed database system and sorting by an item identification number associated with the embedding.

In many embodiments, pre-processing one or more nearest neighbors can comprise excluding a first nearest neighbor of one or more nearest neighbors. In some embodiments, excluding a first nearest neighbor can comprise removing a nearest neighbor from a full text search database. In these or other embodiments, a nearest neighbor can instead be discarded prior to storage in a full text search database. In various embodiments, a first nearest neighbor can be excluded using a hierarchical categorization. In the same or different embodiments, a hierarchical categorization can comprise levels of an item taxonomy. In many embodiments, an item taxonomy can be configured to classify a catalogue of items based on properties of each item of the catalogue of items. In the same or different embodiments, properties of an item can comprise a title, a description, a price, a brand, a manufacturer, a color, a quantity, a volume, a weight, a material, a style, a pattern, a theme, a recommended use, a color, a fabric, etc. In some embodiments, an item taxonomy can comprise distinct levels of item classification. In further embodiments, distinct levels of item classification can narrow as the distinct levels go deeper into an item taxonomy. In various embodiments, distinct levels of item classification can comprise a super department, a department, a category, and/or a sub-category. In many embodiments, a department can be deeper in an item taxonomy than a super department. In the same or different embodiments, a category can be deeper in an item taxonomy than a department. In some embodiments, a sub-category can be deeper in an item taxonomy than a category. For example, an item taxonomy for Shamrock Farms whole milk can comprise a super department of "Eggs and Dairy," a department of "Milk," a category of "Dairy Milk," and a sub-category of "Whole Milk." As another non-limiting example, an item taxonomy for a sofa can comprise a super department of "Home," a department of "Furniture and Appliances," a category of "Living Room," and a sub-category of "Sofas and Sectionals." In both examples described above, the item taxonomy can be further segmented into brand/manufacturer if needed. In many embodiments, an item taxonomy can be received from a computer administered from or by system 300 (FIG. 3). In these or other embodiments, an item taxonomy can be received from a third party system or vendor. In some embodiments, a first nearest neighbor can be excluded when it is categorized outside of a hierarchical level of a specific item in a hierarchical categorization.

In many embodiments, method 400 can comprise an activity 405 of re-ranking one or more nearest neighbors using a learning-to-rank algorithm (i.e. a learning-to-rank framework). In some embodiments, a learning-to-rank algorithm can comprise a machine learning algorithm, as described above, which is configured to determine a similarity score between one or more lists of items. In this way, a learning-to-rank algorithm can be configured to rank an unordered list of items and/or re-rank an ordered list of items by changing rankings of a list to make the list look more similar to lists the algorithm has been trained on. In many embodiments, a learning-to-rank algorithm can be trained on user engagement data. In these or other embodiments, user engagement data can comprise views of an item on a web site by one or more users. In various embodiments, a machine learning algorithm can be trained, at least in part, on a single user's (e.g., user 350) engagement data or the single user's engagement data can be weighted in a training data set. In this way, a machine learning algorithm tailored to a single user can be generated. In the same or different embodiments, a machine learning algorithm tailored to a single user can be used as a pre-trained algorithm for a similar user. In many embodiments, user engagement data can comprise (1) purchases of a nearest neighbor after a user has viewed an item; (2) clicks of the nearest neighbor after the user has viewed the item, (3) views of the respective nearest neighbor after the user has viewed the item, and have not clicked on the respective nearest neighbor, (4) a purchase ratio comprising (3):(1); or (5) a click ratio comprising (3):(2). In these or other embodiments, user engagement data can comprise prices of items, sales ranks of items, colors of items, styles of items, etc.

In many embodiments, a learning-to-rank algorithm can rank items using a pointwise algorithm. In some embodiments, a pointwise algorithm can determine a similarity score for one embedding at a time. In various embodiments, a pointwise algorithm can comprise training a binary classifier or a regressor on user engagement data to determine a similarity score for an embedding. A final ranking of embeddings can then be determined using the similarity score as compared to an embedding for a specific item.

In many embodiments, a learning-to-rank framework can use a pairwise algorithm. In some embodiments, a pairwise algorithm can be configured to compare embeddings of two items to a specific item, and then choose an optimal ordering of the two items based on that comparison. In some embodiments, image embeddings, textual embeddings, and/or user engagement embeddings can be compared in a pairwise algorithm. For example, a LambdaMart, a LambdaSmart, a RankRLS, and/or a RankNet can be used.

In many embodiments, a learning-to-rank framework can use a listwise algorithm. In some embodiments, a listwise algorithm can be configured to compare embeddings of a list items to a specific item, and then choose an optimal ordering of the list of items based on that comparison. In some embodiments, image embeddings, textual embeddings, and/or user engagement embeddings can be compared in a listwise algorithm. For example, a listwise algorithm can comprise a ListMLE algorithm, a FastAP algorithm, and/or an ES-Rank algorithm.

In many embodiments, retraining a machine learned system using a learn-to-rank framework can allow for faster processing times and quicker deployment times that prior approaches. For example, training a model that captures both visual similarity and user preference in a single embedding would have taken magnitudes more training data than using a learning-to-rank framework. For example, a learning-to-rank framework can be used when only 20% of items have a user engagement data. This problem is compounded by the fact that collecting user engagement data can be arduous, and it is therefore beneficial to collect as little as possible.

In many embodiments, method 400 can comprise an activity 406 of facilitating altering a GUI displaying an item. In many embodiments, the GUI can comprise GUIs 350-351 (FIG. 3). In some embodiments, a display of the item can be based upon one or more nearest neighbors of the item, as re-ranked. In these or other embodiments, one or more nearest neighbors, as re-ranked, can be inserted into a GUI using their re-rankings. for example, the one or more nearest neighbors can be displayed sequentially on a GUI in an order defined by their re-ranking. In these or other embodiments, the one or more nearest neighbors can be displayed in a slideshow, a carousel, a video, subsequent webpages, or any other sequential display system known the art.

Figure 5:
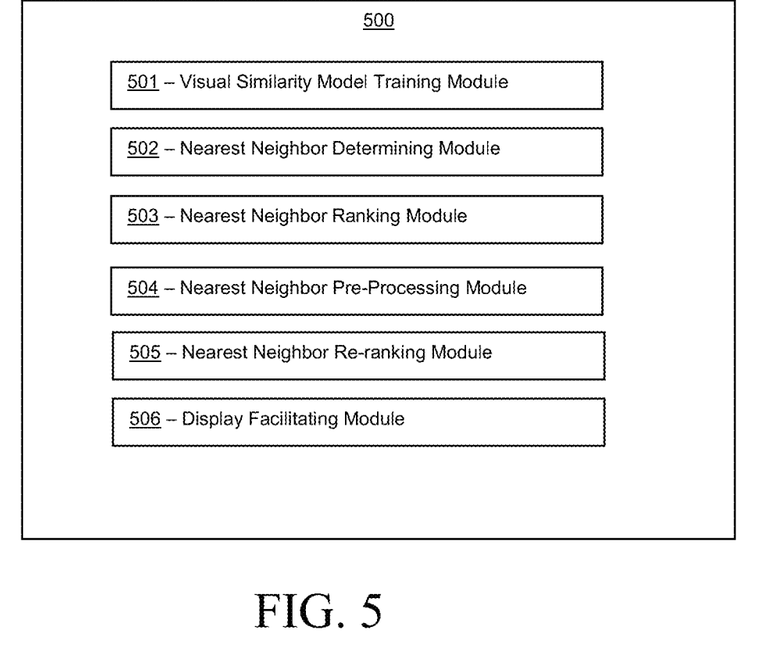
FIG. 5 illustrates a representative block diagram of a system, according to an additional embodiment.

Turning ahead in the drawings, FIG. 5 illustrates a block diagram of a system 500 that can be employed for behavior based messaging. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as visual similarity training module 501. In many embodiments, visual similarity training module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as nearest neighbor determining module 502. In many embodiments, nearest neighbor determining module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as nearest neighbor ranking module 503. In many embodiments, nearest neighbor ranking module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as nearest neighbor pre-processing module 504. In many embodiments, nearest neighbor pre-processing module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as nearest neighbor re-ranking module 505. In many embodiments, nearest neighbor re-ranking module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as display facilitating module 506. In many embodiments, display facilitating module 506 can store computing instructions configured to run on one or more processing modules and perform one or more acts of method 400 (FIG. 4) (e.g., activity 406 (FIG. 4)).

Although systems and methods for retraining of machine learned systems have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform functions comprising:
training a visual similarity model to output one or more vector representations in a vector space of an item based on a training dataset, wherein the visual similarity model comprises an image similarity model and a textual similarity model, wherein:
the image similarity model is configured to retrain, using a convolutional neural network, a repository of digital images of items stored in a data store, wherein a last shared layer of the convolutional neural network outputs an image embedding of the item;
the textual similarity model is configured to use labels from at least non-image features of the item in a recurrent neural network to output a textual embedding of the item; and
the image embedding and the textual embedding comprise embeddings;
determining one or more nearest neighbors based on the embeddings nearest to a respective embedding in the vector space for the item using the visual similarity model, as trained;
ranking the one or more nearest neighbors for the item, using (i) results of the visual similarity model, as trained, and (ii) at least a portion of user engagement data for one or more items;
re-ranking the one or more nearest neighbors of the item using a learning-to-rank algorithm;
inserting the one or more nearest neighbors of the item configured to be displayed in a sequential order, as re-ranked, into a display of the item; and
facilitating altering a graphical user interface (GUI) by displaying the item based upon the one or more nearest neighbors, as re-ranked.

2. The system of claim 1, wherein:
the embeddings are stored as a sparse representation of each embedding, wherein the sparse representation comprises non-zero counts for the one or more vector representations of each embedding in the vector space;
the data store is configured to store high dimensional data;
the high dimensional data comprises data with multiple features;
the embeddings are configured to be encapsulated in a coarser embedding;
the learning-to-rank algorithm is trained on the user engagement data of the item displayed on a website viewed by one or more users; and
the training dataset comprises at least a portion of the repository of digital images of items and a repository of non-image features of the items.

3. The system of claim 2, wherein features of the user engagement data comprise at least one of:
(1) a respective purchase of a respective nearest neighbor of the one or more nearest neighbors after one or more users have viewed the item;
(2) a respective click of the respective nearest neighbor of the one or more nearest neighbors after the one or more users have viewed the item;
(3) a respective view of the respective nearest neighbor of the one or more nearest neighbors after the one or more users have viewed the item, and have not clicked on the respective nearest neighbor;
(4) a purchase ratio comprising a ratio of elements (3):(1); or
(5) a click ratio comprising a ratio of elements (3):(2).

4. The system of claim 1, wherein the one or more nearest neighbors comprise substitutes for the item.

5. The system of claim 1, wherein the learning-to-rank algorithm comprises at least one of:
determining, using a pointwise algorithm, a similarity score for each embedding, wherein the pointwise algorithm is trained on training data, using at least a binary classifier, based on the at least a portion of the user engagement data for the one or more items;
determining, using a pairwise algorithm, the similarity score by comparing the embeddings of two items to the item and selecting an order of the two items compared to the item; or
determining using, a listwise algorithm, the similarity score between a list of items and the item, wherein the learning-to-rank algorithm is configured to compare the embeddings of a list of items to the item in order to select a respective order of the list of items based on an output of the learning-to-rank algorithm.

6. The system of claim 1, wherein training the visual similarity model comprises:
training, in parallel, the image similarity model and the textual similarity model, wherein the visual similarity model comprises the image similarity model and the textual similarity model; and
estimating internal parameters of the image similarity model, the textual similarity model, and the visual similarity model to output one or more vector representations of the item.

7. The system of claim 6, wherein:
the image similarity model is trained on one or more images of the item and one or more images of the one or more nearest neighbors; and
the textual similarity model is trained on one or more non-image features of the item and one or more non-image features of the one or more nearest neighbors.

8. The system of claim 1, wherein the computing instructions, when executed on the one or more processors, further cause the one or more processors to perform a function comprising:
building a main-memory based index to store the embeddings; and
after ranking the one or more nearest neighbors and before re-ranking the one or more nearest neighbors, pre-processing the one or more nearest neighbors.

9. The system of claim 8, wherein pre-processing the one or more nearest neighbors comprises:
excluding a first nearest neighbor of the one or more nearest neighbors when the first nearest neighbor of the one or more nearest neighbors is outside a hierarchical level of the item in a hierarchical categorization.

10. The system of claim 1, wherein facilitating altering the GUI displaying the item based upon the one or more nearest neighbors, as re-ranked, comprises:
    inserting the one or more nearest neighbors, as re-ranked, into an electronic carousel configured to sequentially display the one or more nearest neighbors in an order defined by the re-ranking.

11. A method being implemented via execution of computing instructions configured to run on one or more processors and stored at non-transitory computer-readable media, the method comprising:
    training a visual similarity model to output one or more vector representations in a vector space of an item based on a training dataset, wherein the visual similarity model comprises an image similarity model and a textual similarity model, wherein:
        the image similarity model is configured to retrain, using a convolutional neural network, a repository of digital images of items stored in a data store, wherein a last shared layer of the convolutional neural network outputs an image embedding of the item;
        the textual similarity model is configured to use labels from at least non-image features of the item in a recurrent neural network to output a textual embedding of the item; and
        the image embedding and the textual embedding comprise embeddings;
    determining one or more nearest neighbors based on the embeddings nearest to a respective embedding in the vector space for the item using the visual similarity model, as trained for the item using the visual similarity model, as trained;
    ranking the one or more nearest neighbors for the item, using (i) results of the visual similarity model, as trained, and (ii) at least a portion of user engagement data for one or more items;
    re-ranking the one or more nearest neighbors of the item using a learning-to-rank algorithm;
    inserting the one or more nearest neighbors of the item configured to be displayed in a sequential order, as re-ranked, into a display of the item; and
    facilitating altering a graphical user interface (GUI) by displaying the item based upon the one or more nearest neighbors, as re-ranked.

12. The method of claim 11, wherein:
    the embeddings are stored as a sparse representation of each embedding, wherein the sparse representation comprises non-zero counts for the one or more vector representations of each embedding in the vector space;
    the data store is configured to store high dimensional data;
    the high dimensional data comprises data with multiple features;
    the embeddings are configured to be encapsulated in a coarser embedding;
    the learning-to-rank algorithm is trained on the user engagement data of the item displayed on a website viewed by one or more users; and
    the training dataset comprises at least a portion of the repository of digital images of items and a repository of non-image features of the items.

13. The method of claim 12, wherein features of the user engagement data comprise at least one of:
    (1) a respective purchase of a respective nearest neighbor of the one or more nearest neighbors after one or more users have viewed the item;
    (2) a respective click of the respective nearest neighbor of the one or more nearest neighbors after the one or more users have viewed the item;
    (3) a respective view of the respective nearest neighbor of the one or more nearest neighbors after the one or more users have viewed the item, and have not clicked on the respective nearest neighbor;
    (4) a purchase ratio comprising a ratio of elements (3):(1); or
    (5) a click ratio comprising a ratio of elements (3):(2).

14. The method of claim 11, wherein the one or more nearest neighbors comprise substitutes for the item.

15. The method of claim 11, wherein the learning-to-rank algorithm comprises at least one of:
    determining, using a pointwise algorithm, a similarity score for each embedding, wherein the pointwise algorithm is trained on training data, using at least a binary classifier, based on the at least a portion of the user engagement data for the one or more items;
    determining, using a pairwise algorithm, the similarity score by comparing the embeddings of two items to the item and selecting an order of the two items compared to the item; or
    determining using, a listwise algorithm, the similarity score between a list of items and the item, wherein the learning-to-rank algorithm is configured to compare the embeddings of a list of items to the item in order to select a respective order of the list of items based on an output of the learning-to-rank algorithm.

16. The method of claim 11, wherein training the visual similarity model comprises:
    training, in parallel, the image similarity model and the textual similarity model, wherein the visual similarity model comprises the image similarity model and the textual similarity model; and
    estimating internal parameters of the image similarity model, the textual similarity model, and the visual similarity model to output one or more vector representations of the item.

17. The method of claim 16, wherein:
    the image similarity model is trained on one or more images of the item and one or more images of the one or more nearest neighbors; and
    the textual similarity model is trained on one or more non-image features of the item and one or more non-image features of the one or more nearest neighbors.

18. The method of claim 11 further comprising:
    building a main-memory based index to store the embeddings; and
    after ranking the one or more nearest neighbors and before re-ranking the one or more nearest neighbors, pre-processing the one or more nearest neighbors.

19. The method of claim 11, wherein pre-processing the one or more nearest neighbors comprises:
    excluding a first nearest neighbor of the one or more nearest neighbors when the first nearest neighbor of the one or more nearest neighbors is outside a hierarchical level of the item in a hierarchical categorization.

20. The method of claim 11, wherein facilitating altering the GUI displaying the item based upon the one or more nearest neighbors, as re-ranked, comprises:
    inserting the one or more nearest neighbors, as re-ranked, into an electronic carousel configured to sequentially display the one or more nearest neighbors in an order defined by the re-ranking.

* * * * *